(12) United States Patent
    Strogov et al.

(10) Patent No.: US 12,373,571 B2
(45) Date of Patent: Jul. 29, 2025

(54) SYSTEMS AND METHODS FOR PREVENTING THE SPREAD OF MALWARE IN A SYNCHRONIZED DATA NETWORK

(71) Applicant: Acronis International GmbH, Schaffhausen (CH)

(72) Inventors: Vladimir Strogov, Singapore (SG); Serg Bell, Singapore (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 233 days.

(21) Appl. No.: 17/901,309

(22) Filed: Sep. 1, 2022

(65) Prior Publication Data
    US 2023/0195902 A1    Jun. 22, 2023

Related U.S. Application Data

(60) Provisional application No. 63/292,219, filed on Dec. 21, 2021.

(51) Int. Cl.
    *G06F 21/57*    (2013.01)
(52) U.S. Cl.
    CPC ...... *G06F 21/577* (2013.01); *G06F 2221/032* (2013.01); *G06F 2221/033* (2013.01)
(58) Field of Classification Search
    CPC ............ G06F 21/577; G06F 2221/032; G06F 2221/033; G06F 21/56; G06F 11/1446; G06F 21/565; G06F 16/1734; G06F 16/178; H04L 9/12; H04L 9/50
    USPC .......................................................... 726/25
    See application file for complete search history.

(56) References Cited

U.S. PATENT DOCUMENTS

| | | | | |
|---|---|---|---|---|
| 11,526,609 | B1* | 12/2022 | Elgaafary | G06F 16/137 |
| 2007/0136810 | A1* | 6/2007 | Waltermann | G06F 21/562 |
| | | | | 726/24 |
| 2019/0238565 | A1* | 8/2019 | Wang | G06F 21/566 |
| 2021/0049277 | A1* | 2/2021 | Mueller-Wicke | G06F 21/568 |

* cited by examiner

*Primary Examiner* — Bryan F Wright
(74) *Attorney, Agent, or Firm* — Arent Fox Schiff LLP; Michael Fainberg (57) ABSTRACT

Disclosed herein are systems and method for preventing the spread of malware in a synchronized data network, the method including: receiving, at a first time by a server connected to a plurality of computing devices, a file from a first computing device; monitoring for changes to the file stored on the server; in response to detecting a change, generating a record indicative of the change to the file; receiving, at the server from a second computing device, a download request for the file at a second time; determining whether at least one record exists that indicates any change to the file between the first time and the second time; in response to determining that the record exists, scanning the file for malware; and in response to determining that the file stored on the server is associated with malware, denying the download request.

12 Claims, 5 Drawing Sheets

SYSTEMS AND METHODS FOR PREVENTING THE SPREAD OF MALWARE IN A SYNCHRONIZED DATA NETWORK

CROSS-REFERENCE TO RELATED APPLICATIONS

This application claims the benefit of U.S. Provisional Application No. 63/292,219, filed Dec. 22, 2021, which is herein incorporated by reference.

FIELD OF TECHNOLOGY

The present disclosure relates to the field of data security, and, more specifically, to systems and methods for protecting data during synchronization.

BACKGROUND

In a network of devices, the most common way to synchronize data is by using a central server that receives data from one device (e.g., a smartphone) and then sends the data to all other devices in the network (e.g., a laptop, a computer, a tablet, etc.). The data can be sent to the destination devices as a link or as a copy. A copy provides a duplicated version of the data that can be stored locally on the destination devices. In contrast, a link provides an address to the data on the server and enables the destination devices to access the data directly. This scheme is widely used in modern cloud services to save local disk space.

There is also a direct synchronization method in which the data is sent to the nearest available device without going through a central server. This method is utilized when the devices being synchronized are in the same local area network, and the central server is in the cloud (e.g., a global network).

In both synchronization methods, however, there is a risk of infection of the synchronized data. This is because a considerable amount of time may elapse between the data upload from the source device and the download to the destination devices. During this time, the data may become infected on the central server or the source device.

The standard algorithm for protecting data from possible infection involves performing an anti-malware scan when sending data to the central server. However, the data on the server can be attacked by ransomware and malware before the data is sent to all other synchronized devices in the network. This can happen, for example, when the anti-virus program is temporarily deactivated (often required when installing any new software on the server). Thus, the moment the synchronized data reaches the destination devices, it can be infected, despite the data being clear of issues during the upload from the source device.

SUMMARY

In one exemplary aspect, the techniques described herein relate to a method for preventing the spread of malware in a synchronized data network, the method including: receiving, at a first time by a server connected to a plurality of computing devices, a file from a first computing device of the plurality of computing devices; monitoring for changes to the file stored on the server; in response to detecting a change, generating a record indicative of the change to the file; receiving, from a second computing device of the plurality of computing devices, a download request to download the file from the server, wherein the download request is received at a second time subsequent to the first time; determining whether at least one record exists that indicates any change to the file between the first time and the second time; in response to determining that the record exists, scanning the file for malware; and in response to determining that the file stored on the server is associated with malware, denying the download request.

In some aspects, the techniques described herein relate to a method, wherein receiving the file includes: detecting an upload request to upload the file from the first computing device; requesting, from the first computing device, a scan verdict indicative of whether the file is associated with malware; in response to receiving a scan verdict that the file is not associated with malware, granting the upload request and storing the file on the server at the first time.

In some aspects, the techniques described herein relate to a method, wherein the record is part of a distributed ledger that stores, in a plurality of records, changes made to files on the server.

In some aspects, the techniques described herein relate to a method, wherein the distributed ledger stores changes and scan verdicts exclusive to files synchronized across the plurality of computing devices, and wherein each record of the plurality of records is verified by the plurality of computing devices.

In some aspects, the techniques described herein relate to a method, further including: performing a remediation action including one or more of: removing the file from the server, placing the file in quarantine on the server, and requesting, from the first computing device, a version of the file that is not associated with malware.

In some aspects, the techniques described herein relate to a method, further including: in response to determining that the file stored on the server is not associated with malware, granting the download request and transmitting the file to the second computing device.

In some aspects, the techniques described herein relate to a method, further including: generating another record that includes results of the scan performed on the file stored on the server, wherein the results indicate that the file is not associated with malware.

In some aspects, the techniques described herein relate to a method, further including: receiving, from a third computing device, another download request to download the file from the server, wherein the another download request is received at a third time subsequent to the second time; in response to determining that the another record is a latest record for the file, granting the another download request without performing another scan of the file.

It should be noted that the methods described above may be implemented in a system comprising a hardware processor. Alternatively, the methods may be implemented using computer executable instructions of a non-transitory computer readable medium.

In some aspects, the techniques described herein relate to a system for preventing the spread of malware in a synchronized data network, the system including: a memory; and a hardware processor communicatively coupled with the memory and configured to: receive, at a first time by a server connected to a plurality of computing devices, a file from a first computing device of the plurality of computing devices; monitor for changes to the file stored on the server; in response to detecting a change, generate a record indicative of the change to the file; receive, from a second computing device of the plurality of computing devices, a download request to download the file from the server, wherein the download request is received at a second time subsequent to the first time; determine whether at least one record exists that indicates any change to the file between the first time and the second time; in response to determining that the record exists, scan the file for malware; and in response to determining that the file stored on the server is associated with malware, deny the download request.

In some aspects, the techniques described herein relate to a non-transitory computer readable medium storing thereon computer executable instructions for preventing the spread of malware in a synchronized data network, including instructions for: receiving, at a first time by a server connected to a plurality of computing devices, a file from a first computing device of the plurality of computing devices; monitoring for changes to the file stored on the server; in response to detecting a change, generating a record indicative of the change to the file; receiving, from a second computing device of the plurality of computing devices, a download request to download the file from the server, wherein the download request is received at a second time subsequent to the first time; determining whether at least one record exists that indicates any change to the file between the first time and the second time; in response to determining that the record exists, scanning the file for malware; and in response to determining that the file stored on the server is associated with malware, denying the download request.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for preventing the spread of malware in a synchronized data network. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

A basic approach to addressing the shortcomings described previously involve scanning any file that needs to be synchronized multiple times (i.e., once when it is being uploaded from the source device, and once for each destination device that will download the file). However, double scans significantly slow down synchronization times and reduce performance. If every file is being scanned multiple times despite the file undergoing no changes, there is a significant waste of processing resources that can be better utilized for other purposes.

The present disclosure thus presents the concept of performing another scan during the download to the destination device only if the data has been somehow changed in the interval between being uploaded and downloaded. However, to control the immutability of data, a monitoring driver and a distributed ledger (e.g., a blockchain) are employed. A distributed ledger prevents the need for multiple copies of a single file. For example, one inefficient approach to checking whether a file has changed is by comparing a version of the file during upload with a version of file during download. The inefficiency arises in the fact that at least two versions of the file will need to be stored at all times. This approach requires twice as much space and still requires considerable computation when comparing thousands of files being uploaded and downloaded.

The benefits of using the distributed ledger lay in the fact that changes to the file may be recorded on the ledger and verified by a blockchain network (e.g., which may comprise the devices in the synchronization network). Recording events is done in parallel with normal usage of the devices in the network and the server, and thus all computation (i.e., comparing files) is not focused around the downloading process—instead it simply involves confirming if a change was recorded on the ledger. Moreover, if multiple computing devices are downloading the file that has undergone a change, and a scan has already been performed and recorded on the distributed ledger (labelling the change as benign), additional scans will not be necessary for each new computing device synchronizing its local contents with the central server—they can all refer to the record in the distributed ledger. This differs from the brute-force file comparison approach in which each new computing device will need a new scan on a basis that the current version of the file is different from the uploaded version. Furthermore, a malicious entity cannot mask/hide its changes to a file on the central server because each change is verified by the members of the distributed ledger network.

Figure 1:
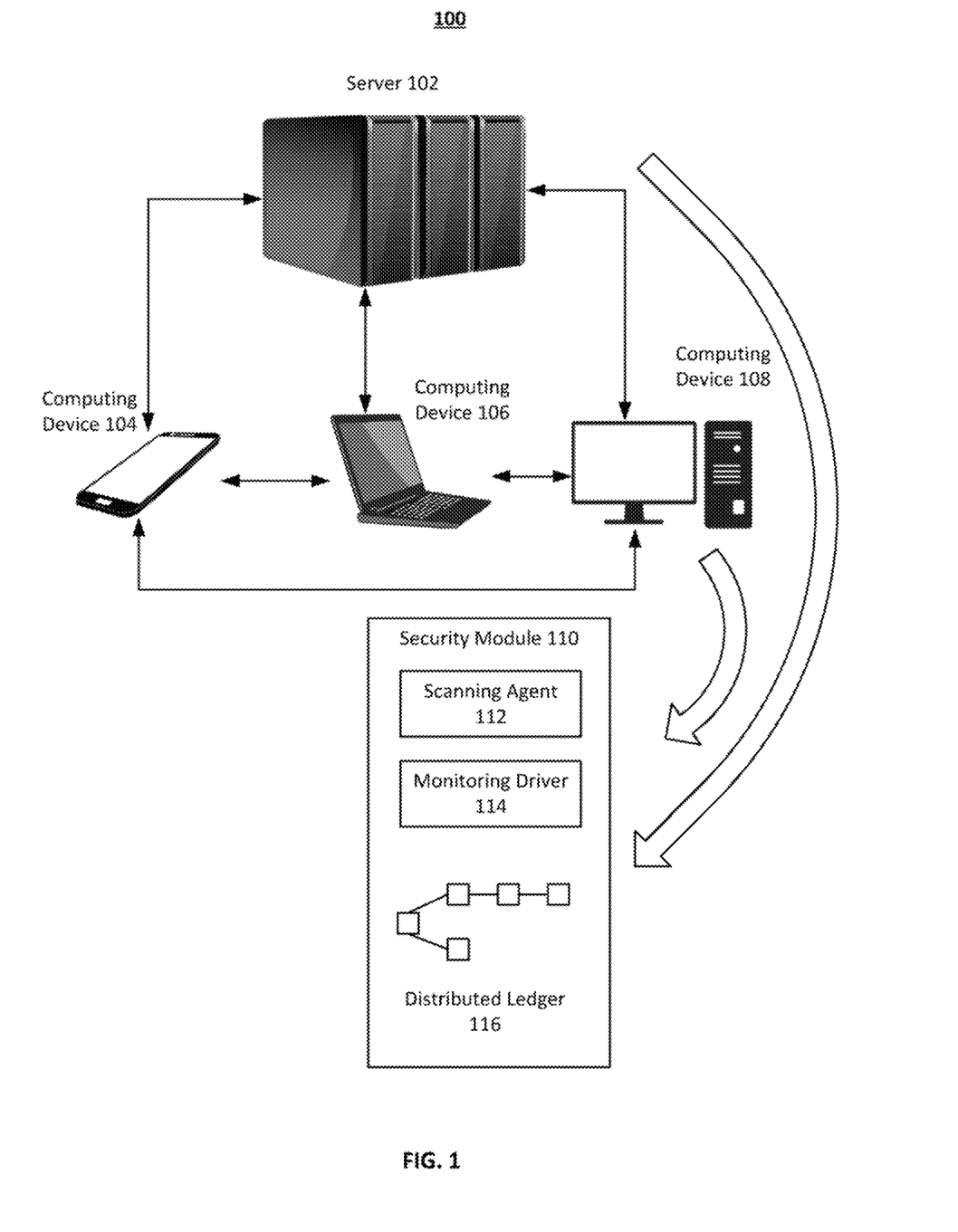
FIG. 1 is a block diagram illustrating a system for preventing the spread of malware in a synchronized data network.

FIG. 1 is a block diagram illustrating system 100 for preventing the spread of malware in a synchronized data network. In system 100, computing device 104 may be a smartphone, computing device 106 may be a laptop, and computing device 108 may be a desktop computer. Each computing device is connected to each other in a synchronization network. For example, a user may capture an image using computing device 104, which may be synchronized with computing device 106 and computing device 108. Accordingly, a copy or link of the image may be provided to computing device 106 and computing device 108. For example, a copy of the image may first be stored on server 102, which then transmits copies of the stored image to computing device 106 and computing device 108.

In order to ensure that malicious activity does not spread throughout the network, security module 110 is introduced. Security module 110 includes scanning agent 112, monitoring driver 114, and distributed ledger 116. Scanning agent 112 may be an anti-virus software that checks for malicious activity in one or more files. Monitoring driver 114 may intercept modification commands on server 102 to determine whether files have been added, removed, or modified on server 102. Distributed ledger 116 may be a blockchain that is stored on each of the computing devices 104, 106, and 108, and server 102.

Security module 110 may be stored on each of the devices shown in FIG. 1. In some aspects, the version of security module 110 stored on server 102 may be different than the version of security module 110 stored on server 102. For example, monitoring driver 114 may be stored as a thin and thick module on the computing devices and the server, respectively. The thick module of monitoring driver 114 may track changes made on server 102 and update (i.e., write to) distributed ledger 116. The thin module of monitoring driver 114 may read the updates on distributed ledger 116.

Figure 2:
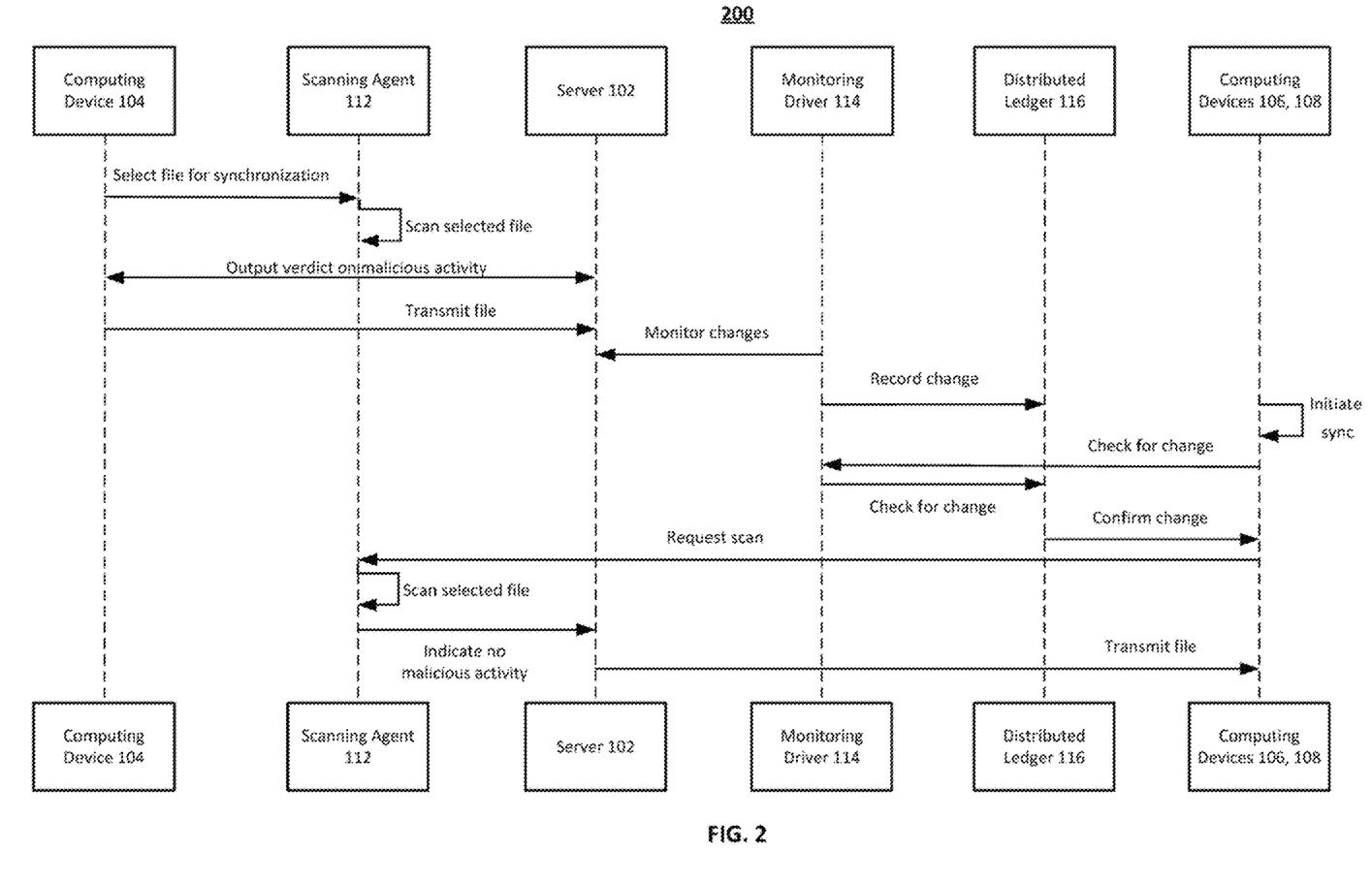
FIG. 2 is a block diagram illustrating selective scanning of a synchronized file.

FIG. 2 is a block diagram 200 illustrating selective scanning of a synchronized file. In block diagram 200, computing device 104 selects a local file (e.g., an image) for synchronization. Scanning agent 112 on computing device 104 or server 102 may scan the selected file to ensure that the file is not malicious. Scanning agent 112 may then output a verdict (i.e., file is malicious or file is not malicious). In an exemplary aspect, a file is selected and scanned on computing device 104 and subsequently transmitted to server 102 in response to a verdict by scanning agent 112 that no malicious activity is detected.

Monitoring driver 114 monitors for changes on server 102 (e.g., the selected file being written to server 102). In response to detecting a change, monitoring driver 114 may generate a record on distributed ledger 116. The record may indicate that the file has been written to server 102. Other changes that may take place include the directory of the file being changed, the file being renamed, the file being compressed, the file being encrypted, etc. Each change on server 102 is detected by monitoring driver 114 and recorded on distributed ledger 116.

In some aspects, distributed ledger 116 is a chain of all changes made on server 102. For example, a single blockchain may include every modification made to a storage space of server 102. In some aspects, distributed ledger 116 is a chain of all changes made to files associated with the network comprising computing devices 104, 106, and 108. For example, server 102 may store information for different networks and each network may have its own blockchain associated with it. In some aspects, distributed ledger 116 may be a chain of all changes made to a specific file. Accordingly, each file has its own blockchain that records each change made to the file while stored on server 102. Suppose that in this example, distributed ledger 116 is the second type of chain (i.e., one associated with a specific network of devices). A copy of distributed ledger 116 is synchronized with all devices in the network and each record is verified by each device as well.

Computing device 106 or 108 may initiate a synchronization action. For example, computing device 106 and/or 108 may launch a photo viewing application that attempts to synchronize its contents with server 102. If the file is an image, the initiation of synchronization may be considered a request for the image. Computing devices 106 and 108 may each have a monitoring driver 114 that then checks distributed ledger 116 for a change to the file. As mentioned previously, monitoring driver 114 may be a thin client that reads the records on distributed ledger 116. For example, monitoring driver 114 may search for records that include an identifier (e.g., name, size, extension, etc.) of the file. In response to detecting records subsequent to an upload record, computing device 106 and/or 108 may confirm that a change to the file has taken place and may request a scan before the download process begins.

Scanning agent 114 of server 102 may scan the file and output a verdict. In response to detecting malicious activity, the synchronization is cancelled and the file is either deleted or quarantined. This prevents the spread of the malicious activity. If no malicious activity is detected, server 102 transmits the file to computing device 106 and/or 108.

In some aspects, the verdict of a scan is recorded on distributed ledger 116. If no malicious activity is found, a record is generated by scanning agent 112 indicating a time that the scan took place and the verdict. Suppose that the scan was initialized by a synchronization request from computing device 106. After some time, computing device 108 requests to synchronize the file as well. Monitoring agent 114 of computing device 108 may detect that the latest record of the file indicates that the file is not malware. Despite there being changes to the file prior to the scan, because the latest scan already indicates that malware is not present, another scan is not performed during synchronization with computing device 108. This saves processing resources because unnecessary scans are avoided.

In some aspects, whenever a scan is performed or a change occurs, monitoring driver 114 generates a hash value record for distributed ledger 116. In the case of a change, the hash value may be generated using a hash function applied on a timestamp and the changed file. In the case of a scan, the hash value may be generated using a hash function application on a timestamp, a scan verdict, and the scanned file.

Figure 3:
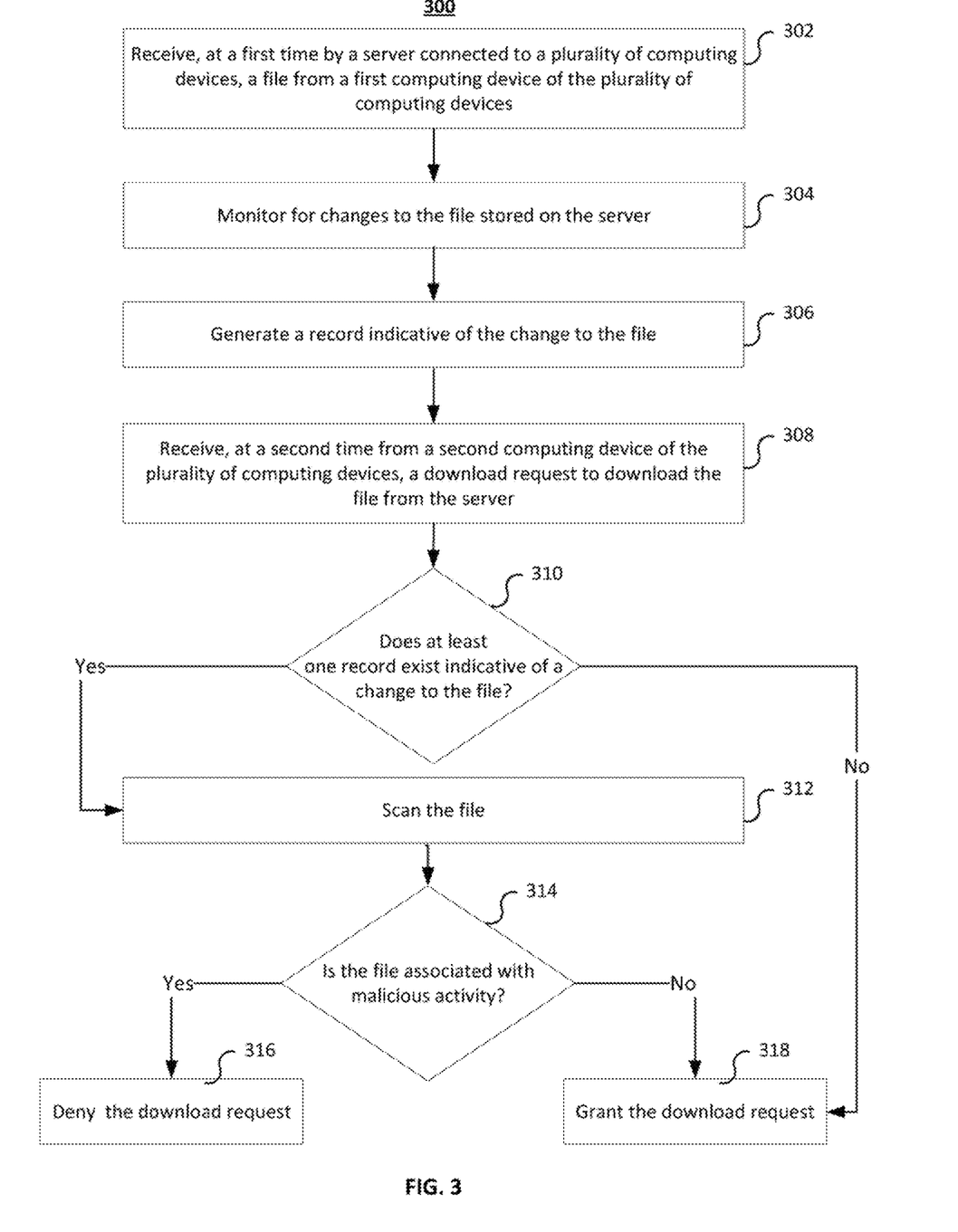
FIG. 3 illustrates a flow diagram of a method for preventing the spread of malware in a synchronized data network.

FIG. 3 illustrates a flow diagram of method 300 for preventing the spread of malware in a synchronized data network. At 302, security module 110 receives, at a first time by a server connected to a plurality of computing devices, a file from a first computing device of the plurality of computing devices. For example, in some aspects, security module 110 detects an upload request to upload the file from computing device 104, and requests, from computing device 104, a scan verdict indicative of whether the file is associated with malware. In response to receiving a scan verdict that the file is not associated with malware, security module 110 grants the upload request and stores the file on server 102 at the first time.

At 304, security module 110 monitors for changes to the file stored on server 102. At 306, in response to detecting a change at 304, security module 110 generates a record indicative of the change to the file. In some aspects, the record is part of a distributed ledger that stores, in a plurality of records, changes made to files on the server. In some aspects, the distributed ledger stores changes and scan verdicts exclusive to files synchronized across the plurality of computing devices. Furthermore, each record of the plurality of records is verified by the plurality of computing devices.

At 308, security module 110 receives, from a second computing device of the plurality of computing devices, a download request to download the file from the server, wherein the download request is received at a second time subsequent to the first time.

At 310, security module 110 determines whether at least one record exists that indicates any change to the file between the first time and the second time. In response to determining that the record exists, method 300 advances to 312, where security module 110 scans the file for malware. At 314, security module 110 determines whether the file stored on the server is associated with malware. In response to determining that the file stored on the server is associated with malware, method 300 advances to 316, where security module 110 denies the download request.

In some aspects, in addition to denying the download request, security module 110 performs a remediation action comprising one or more of: removing the file from the server, placing the file in quarantine on the server, and requesting, from the first computing device, a version of the file that is not associated with malware.

If at 310, security module 110 determines that no record indicative of a change exists, method 300 advances to 318, where security module 110 grants the download request. Likewise, if at 314, security module 110 determines that the file is not associated with malicious activity, method 300 advances to 318, where security module 110 grants the download request. Here, granting the download request involves transmitting the file to the second computing device.

In some aspects, subsequent to a scan, security module 110 generates another record that includes results of the scan performed on the file stored on the server. For example, the results may indicate that the file is not associated with malware. Subsequently, security module 110 may receive, from a third computing device, another download request to download the file from the server, wherein the another download request is received at a third time subsequent to the second time. In response to determining that the another record is a latest record for the file, security module 110 grants the another download request without performing another scan of the file.

Figure 4:
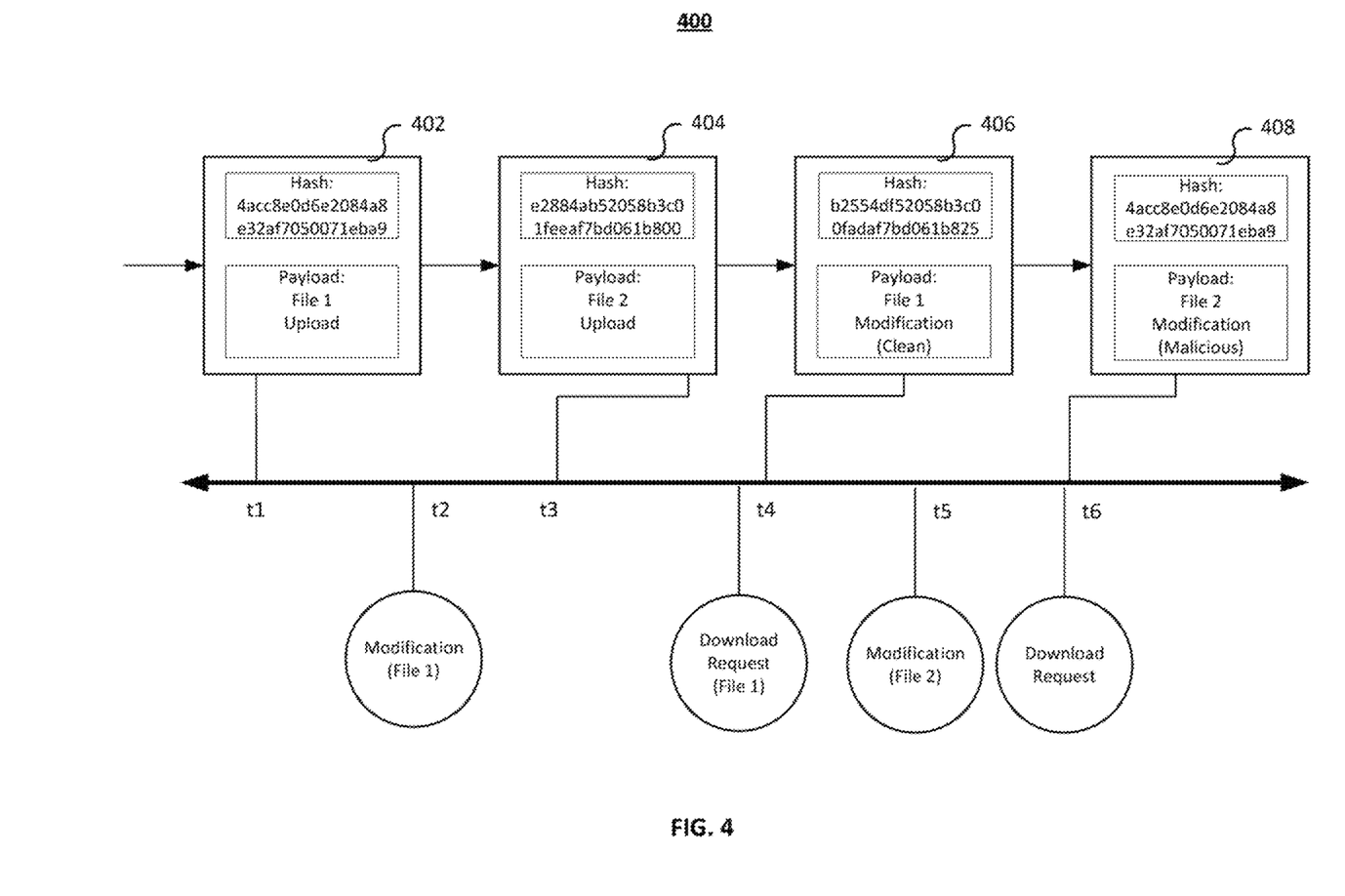
FIG. 4 is a block diagram illustrating records of synchronized files on the distributed ledger.

FIG. 4 is block diagram 400 illustrating records of synchronized files on the distributed ledger. Suppose that computing device 104 uploads a first file to server 102. Computing device 104 and/or server 102 confirms that the first file is non-malicious using a scanning agent. In response to the confirmation, at t1, security module 110 may calculate a hash value of the first file using a hashing algorithm such as SHA1, MD5, etc., and generate record 402 in distributed ledger 116. A record may include information such as timestamp, action type, a file identifier (e.g., source device address, directory, name, size, extension, etc.), a hash value associated with the previous record, etc. For simplicity, however, record 402 on FIG. 4 solely depicts the hash value of the file and a payload indicating what the hash value is associated with. For example, record 402 represents the uploading of file 1 to server 102 from computing device 104.

According to the timeline, at t2, the uploaded first file is modified on server 102. In some aspects, security module 110 may intercept commands that modify the first file in order to generate records representing the modifications. For example, if the first file comprises source code and the modification is an injection of code, security module 110 may detect the injection and generate a record indicating that the first file has been modified and its new hash value. In some aspects, however, security module 110 may only track modifications when a download request is made to save storage space (as several modifications may cause distributed ledger 116 to exponentially increase in size). For example, in FIG. 4, no record is created at time t2. Instead, at t4, server 102 receives a download request (e.g., from computing device 106) for the first file. Security module 110 may then calculate a hash value of the first file at t4 and search for the hash value in distributed ledger 116. Because the first file has been modified at time t2, security module 110 may not find a matching hash value.

When a match is not found, security module 110 concludes that the first file must have been modified since being uploaded. This prompts security module 110 to re-scan the first file. Suppose that the result of the scan is that the modified first file is not malicious. Security module 110 may generate record 406, which indicates that the file is clean and includes a hash value of the modified first file. Because the first file is clean despite being modified, security module 110 executes the download request.

Suppose that at time t6, server 102 receives another download request for the first file (e.g., from computing device 108). Between t4 and t6, the file has not undergone another change at server 102. Therefore, the hash value that security module 110 calculates for the first file at time t6 will match the hash value in record 406. Because record 406 indicates that the first file is clean, security module 110 executes the download request.

It should be noted that several files may be uploaded to server 102 from the plurality of computing devices. For example, at time t3, a second file may be uploaded from computing device 108. Upon confirming that the second file is clean, security module 110 may generate record 404, which includes an indication that file 2 has been uploaded and a hash value of the second file. At time t5, the second file may be maliciously modified (e.g., a malicious entity may inject malware into the source code of the second file). Suppose that at t6, the download request is for the second file. Because the second file has been modified at t5, when security module 110 calculates a new hash value of the second file at t6, the resulting hash value does not match any of the hash values in distributed ledger (e.g., including the hash value in record 404). Accordingly, security module 110 may scan the second file and determine that the second file is malicious. Security module 110 may then deny the download request and generate record 408, which includes an indication that the modified second file is malicious and the hash value of the modified second file. Whenever a subsequent download request is received for the second file, security module 110 may automatically deny the request in view of record 408.

In some aspects, distributed ledger 116 may be very large in size. For example, the record indicating that file 1 has been uploaded may be several hundred records away from when file 1 is requested for download. Because comparing each hash value may be cumbersome and time consuming, security module 110 may first compare a calculated hash value with hash values of files that are most commonly accessed, may compare records backwards in time until the upload record of a file, may utilize indexing methods, and may also utilizing caching. This can improve search times.

Figure 5:
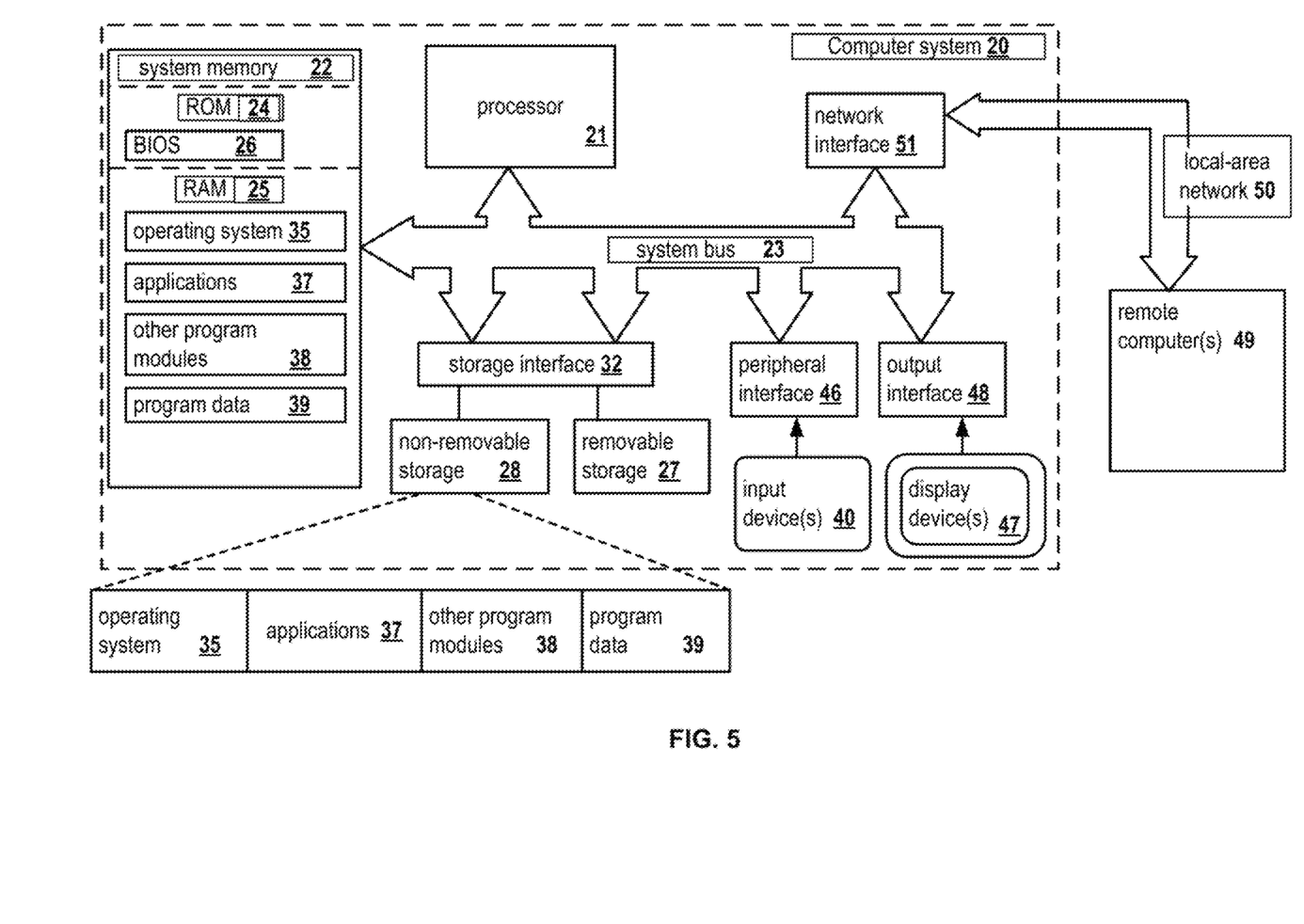
FIG. 5 presents an example of a general-purpose computer system on which aspects of the present disclosure can be implemented.

FIG. 5 is a block diagram illustrating a computer system 20 on which aspects of systems and methods for preventing the spread of malware in a synchronized data network may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-4 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for preventing the spread of malware in a synchronized data network, the method comprising:
   receiving, at a first time by a server connected to a plurality of computing devices, a file from a first computing device of the plurality of computing devices;
   monitoring for changes to the file stored on the server;
   in response to detecting a change, generating a record indicative of the change to the file, wherein the record is part of a distributed ledger that stores, in a plurality of records, changes made to files on the server;
   receiving, from a second computing device of the plurality of computing devices, a download request to download the file from the server, wherein the download request is received at a second time subsequent to the first time, wherein only when download requests are received are latest changes and scan verdicts, exclusive to files synchronized across the plurality of computing devices, tracked and stored on the distributed ledger, and wherein each record of the plurality of records is verified by the plurality of computing devices;
   determining whether at least one record exists in the distributed ledger that indicates any change to the file between the first time and the second time;
   in response to determining that the record exists, scanning the file for malware;
   in response to determining that the file stored on the server is associated with malware based on the distributed ledger, denying the download request;
   in response to determining that the file is not associated with malware based on the distributed ledger, granting the download request and generating another record in the distributed ledger that includes results indicating that the file is not associated with malware;
   receiving, from a third computing device, another download request to download the file from the server, wherein the another download request is received at a third time subsequent to the second time; and
   in response to determining that the another record is a latest record for the file based on the distributed ledger, granting the another download request without performing another scan of the file.

2. The method of claim 1, wherein receiving the file comprises:
   detecting an upload request to upload the file from the first computing device;
   requesting, from the first computing device, a scan verdict indicative of whether the file is associated with malware;
   in response to receiving a scan verdict that the file is not associated with malware, granting the upload request and storing the file on the server at the first time.

3. The method of claim 1, further comprising:
   performing a remediation action comprising one or more of:
      removing the file from the server,
      placing the file in quarantine on the server, and
      requesting, from the first computing device, a version of the file that is not associated with malware.

4. The method of claim 1, further comprising:
   in response to determining that the file stored on the server is not associated with malware, transmitting the file to the second computing device.

5. The method of 1, further comprising:
   transmitting the file to the third computing device.

6. A system for preventing the spread of malware in a synchronized data network, the system comprising:
   a memory; and
   a hardware processor communicatively coupled with the memory and configured to:
      receive, at a first time by a server connected to a plurality of computing devices, a file from a first computing device of the plurality of computing devices;

monitor for changes to the file stored on the server;
in response to detecting a change, generate a record indicative of the change to the file, wherein the record is part of a distributed ledger that stores, in a plurality of records, changes made to files on the server;
receive, from a second computing device of the plurality of computing devices, a download request to download the file from the server, wherein the download request is received at a second time subsequent to the first time, wherein only when download requests are received are latest changes and scan verdicts, exclusive to files synchronized across the plurality of computing devices, tracked and stored on the distributed ledger, and wherein each record of the plurality of records is verified by the plurality of computing devices;
determine whether at least one record exists in the distributed ledger that indicates any change to the file between the first time and the second time;
in response to determining that the record exists, scan the file for malware;
in response to determining that the file stored on the server is associated with malware based on the distributed ledger, deny the download request;
in response to determining that the file is not associated with malware based on the distributed ledger, grant the download request and generating another record in the distributed ledger that includes results indicating that the file is not associated with malware;
receive, from a third computing device, another download request to download the file from the server, wherein the another download request is received at a third time subsequent to the second time; and
in response to determining that the another record is a latest record for the file based on the distributed ledger, grant the another download request without performing another scan of the file.

7. The system of claim 6, wherein the hardware processor is configured to receive the file by:
detecting an upload request to upload the file from the first computing device;
requesting, from the first computing device, a scan verdict indicative of whether the file is associated with malware; and
in response to receiving a scan verdict that the file is not associated with malware, granting the upload request and storing the file on the server at the first time.

8. The system of claim 6, wherein the hardware processor is further configured to:
perform a remediation action comprising one or more of:
removing the file from the server,
placing the file in quarantine on the server, and
requesting, from the first computing device, a version of the file that is not associated with malware.

9. The system of claim 6, wherein the hardware processor is further configured to:
in response to determining that the file stored on the server is not associated with malware, transmit the file to the second computing device.

10. The system of claim 6, wherein the hardware processor is further configured to:
transmit the file to the third computing device.

11. A non-transitory computer readable medium storing thereon computer executable instructions for preventing the spread of malware in a synchronized data network, including instructions for:
receiving, at a first time by a server connected to a plurality of computing devices, a file from a first computing device of the plurality of computing devices;
monitoring for changes to the file stored on the server;
in response to detecting a change, generating a record indicative of the change to the file, wherein the record is part of a distributed ledger that stores, in a plurality of records, changes made to files on the server;
receiving, from a second computing device of the plurality of computing devices, a download request to download the file from the server, wherein the download request is received at a second time subsequent to the first time, wherein only when download requests are received are latest changes and scan verdicts, exclusive to files synchronized across the plurality of computing devices, tracked and stored on the distributed ledger, and wherein each record of the plurality of records is verified by the plurality of computing devices;
determining whether at least one record exists in the distributed ledger that indicates any change to the file between the first time and the second time;
in response to determining that the record exists, scanning the file for malware;
in response to determining that the file stored on the server is associated with malware based on the distributed ledger, denying the download request;
in response to determining that the file is not associated with malware based on the distributed ledger, granting the download request and generating another record in the distributed ledger that includes results indicating that the file is not associated with malware;
receiving, from a third computing device, another download request to download the file from the server, wherein the another download request is received at a third time subsequent to the second time; and
in response to determining that the another record is a latest record for the file based on the distributed ledger, granting the another download request without performing another scan of the file.

12. The non-transitory computer readable medium of claim 11, wherein an instruction for receiving the file further comprises instructions for:
detecting an upload request to upload the file from the first computing device;
requesting, from the first computing device, a scan verdict indicative of whether the file is associated with malware;
in response to receiving a scan verdict that the file is not associated with malware, granting the upload request and storing the file on the server at the first time.

* * * * *